(12) United States Patent
Kuroda et al.

(10) Patent No.: US 12,482,811 B2
(45) Date of Patent: **\*Nov. 25, 2025**

(54) POSITIVE ELECTRODE FOR NONAQUEOUS-ELECTROLYTE SECONDARY BATTERY AND NONAQUEOUS-ELECTROLYTE SECONDARY BATTERY USING SAME

(71) Applicant: Panasonic Intellectual Property Management Co., Ltd., Kadoma (JP)

(72) Inventors: Kosuke Kuroda, Osaka Fu (JP); Youichirou Uka, Hyogo Ken (JP); Koh Masahara, Hyogo Ken (JP); Rina Yamamoto, Hyogo Ken (JP); Tomohiro Harada, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/284,686

(22) PCT Filed: Mar. 30, 2022

(86) PCT No.: PCT/JP2022/016082
§ 371 (c)(1),
(2) Date: Sep. 28, 2023

(87) PCT Pub. No.: WO2022/210910
PCT Pub. Date: Oct. 6, 2022

(65) Prior Publication Data
US 2024/0162415 A1    May 16, 2024

(30) Foreign Application Priority Data
Mar. 31, 2021 (JP) .................. 2021-061239

(51) Int. Cl.
*H01B 1/20* (2006.01)
*H01M 4/36* (2006.01)
(Continued)

(52) U.S. Cl.
CPC .............. *H01M 4/364* (2013.01); *H01B 1/20* (2013.01); *H01M 4/525* (2013.01); *H01M 4/583* (2013.01);
(Continued)

(58) Field of Classification Search
CPC .. H01B 1/00; H01B 1/20; H01B 1/24; H01M 4/13; H01M 4/505; H01M 4/525; H01M 4/62
See application file for complete search history.

(56) References Cited

U.S. PATENT DOCUMENTS

2006/0222952 A1   10/2006  Kono et al.
2011/0159363 A1    6/2011  Tanaka et al.
(Continued)

FOREIGN PATENT DOCUMENTS

EP       4068318    * 10/2022
JP    2006-134777 A    5/2006
(Continued)

OTHER PUBLICATIONS

English language translation of form PCT/ISA/237 (mailed May 2022).*
(Continued)

*Primary Examiner* — Mark Kopec
(74) *Attorney, Agent, or Firm* — WHDA, LLP

(57) ABSTRACT

A disclosed positive electrode for a nonaqueous electrolyte secondary battery includes a positive-electrode current collector and a positive-electrode mixture layer on a surface of the positive-electrode current collector. The positive-electrode mixture layer includes a positive-electrode active
(Continued)

material, a conductive material, and binders. The binders include a polyvinylpyrrolidone-based compound and a cellulose derivative.

12 Claims, 1 Drawing Sheet

(51) Int. Cl.
*H01M 4/525* (2010.01)
*H01M 4/583* (2010.01)
*H01M 4/62* (2006.01)
*H01M 4/02* (2006.01)
*H01M 4/13* (2010.01)
*H01M 4/66* (2006.01)

(52) U.S. Cl.
CPC ...... *H01M 4/623* (2013.01); *H01M 2004/028* (2013.01); *H01M 4/13* (2013.01); *H01M 4/661* (2013.01)

(56) References Cited

U.S. PATENT DOCUMENTS

| | | | | |
|---|---|---|---|---|
| 2015/0380725 | A1* | 12/2015 | Mine | H01M 4/0471 429/231.8 |
| 2016/0020466 | A1* | 1/2016 | Ulbrich | H01M 4/525 252/511 |
| 2018/0226650 | A1 | 8/2018 | Yoo et al. | |
| 2019/0044150 | A1 | 2/2019 | Kim et al. | |
| 2020/0194775 | A1* | 6/2020 | Umetsu | H01M 4/505 |
| 2021/0226222 | A1* | 7/2021 | Morita | C01B 32/174 |
| 2021/0305576 | A1* | 9/2021 | Konishi | C01B 32/192 |
| 2022/0190380 | A1 | 6/2022 | Hirakawa et al. | |
| 2022/0336795 | A1 | 10/2022 | Aoki et al. | |

FOREIGN PATENT DOCUMENTS

| | | | | |
|---|---|---|---|---|
| JP | 2011-134575 | A | 7/2011 | |
| JP | 2020-019705 | A | 2/2020 | |
| KR | 10-2016-0011558 | A | 2/2016 | |
| WO | 2016/030710 | A1 | 3/2016 | |
| WO | 2017/038628 | A1 | 3/2017 | |
| WO | 2019/098197 | A1 | 5/2019 | |
| WO | 2020/004095 | A1 | 1/2020 | |
| WO | 2020/203421 | A1 | 10/2020 | |
| WO | 2021/049198 | A1 | 3/2021 | |
| WO | WO-2021106660 | A1 * | 6/2021 | ............ C09D 5/24 |
| WO | 2021/140899 | A1 | 7/2021 | |

OTHER PUBLICATIONS

International Search Report dated May 24, 2022, issued in counterpart International Application No. PCT/JP2022/016082 (7 pages).
Non-Final Office Action dated Oct. 22, 2024, issued in U.S. Appl. No. 18/284,205. (14 pages).
International Preliminary Report on Patentability (Form PCT/IB/373) issued in International application No. PCT/JP2022/016073 (counterpart to U.S. Appl. No. 18/284,205) mailed Oct. 3, 2023 with Form PCT/ISA/237, with English translation. (4 pages).
International Search Report dated Jun. 14, 2022, issued in International application No. PCT/JP2022/016073 (counterpart to U.S. Appl. No. 18/284,205), with English translation. (5 pages).
Non-Final Office Action dated Oct. 22, 2024, issued in U.S. Appl. No. 18/284,686. (17 pages).
English translation of Written Opinion dated May 24, 2022, issued in International application No. PCT/JP2022/016082 (counterpart to U.S. Appl. No. 18/284,686). (7 pages).
International Search Report dated May 24, 2022, issued in International application No. PCT/JP2022/016082 (counterpart to U.S. Appl. No. 18/284,686), with English translation. (7 pages).

* cited by examiner

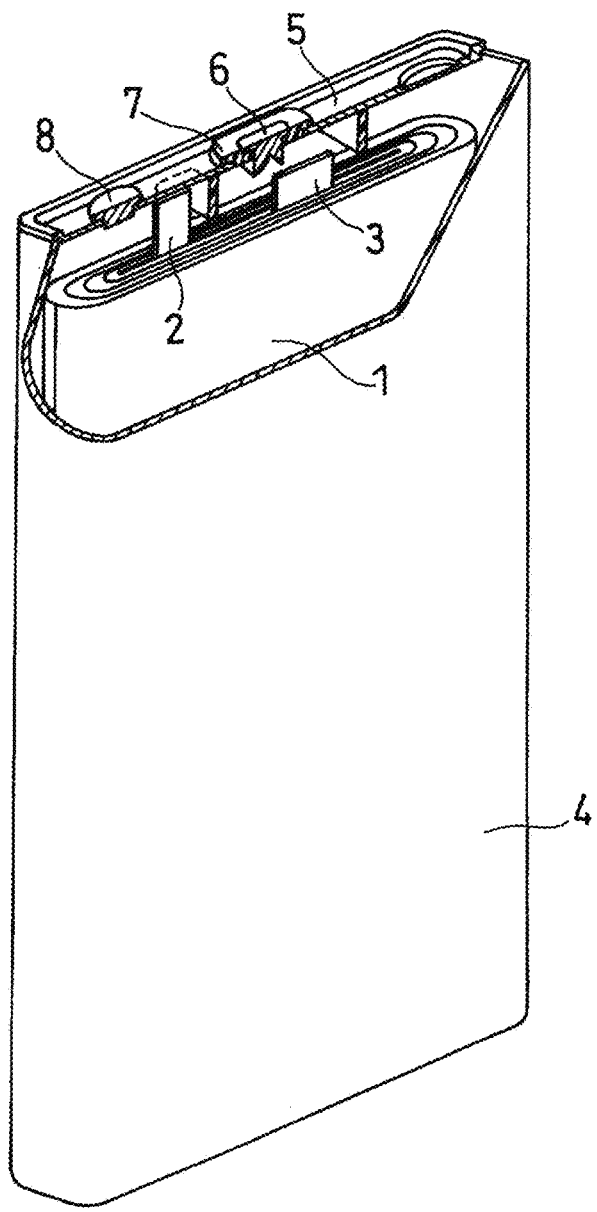

POSITIVE ELECTRODE FOR NONAQUEOUS-ELECTROLYTE SECONDARY BATTERY AND NONAQUEOUS-ELECTROLYTE SECONDARY BATTERY USING SAME

CROSS REFERENCE TO RELATED APPLICATIONS

This Application is the National Stage of International Application No. PCT/JP2022/016082, filed on Mar. 30, 2022, which claims priority from Application No. 2021-061239 filed on Mar. 31, 2021 in Japan. The entire contents of these applications are incorporated herein by reference in their entirety.

TECHNICAL FIELD

The present disclosure relates to a positive electrode for a nonaqueous electrolyte secondary battery and a nonaqueous electrolyte secondary battery including the positive electrode.

BACKGROUND ART

Nonaqueous electrolyte secondary batteries have high output power and high energy density, and accordingly have various uses such as consumer uses and in-vehicle uses. In recent years, there are demands for nonaqueous electrolyte secondary batteries that have higher durability and higher energy density. As a method for realizing such a nonaqueous electrolyte secondary battery, there is a known method of producing a battery with use of an electrode obtained by loading a large amount of positive-electrode active material having a large charge-discharge capacity per unit area and compressing the loaded material with a high pressure. The larger the amount of positive-electrode active material loaded per unit area becomes, the more migration of a conductive material and a binder is likely to progress in a process for producing a positive electrode. Consequently, the adhesive strength of the positive-electrode active material may decrease and the energy density may decrease.

On the other hand, technology for increasing the conductivity of a positive-electrode mixture layer is known as a method for increasing performance of nonaqueous electrolyte secondary batteries. For example, conductive materials such as carbon nanotubes have been conventionally added to a positive-electrode mixture. In the case where a conductive material that is likely to aggregate, such as carbon nanotubes, is used, it is important to uniformly disperse the conductive material in the positive-electrode mixture layer.

PTL 1 (Japanese Laid-Open Patent Publication No. 2020-19705) discloses, as a dispersion liquid to be used to produce an electrode, "a carbon nanotube dispersion including: bundle-type carbon nanotubes; a dispersion medium; and partially hydrogenated nitrile rubber having a residual double bond (RDB) value of 0.5% by weight to 40% by weight calculated according to the following Mathematical Formula 1, wherein dispersed particle diameters of the carbon nanotubes have particle size distribution $D_{50}$ of 3 μm to 10 μm: [Mathematical Formula 1] RDB % by weight=BD weight/(BD weight+HBD weight)×100, where BD means a conjugated diene-derived structure unit and HBD means a hydrogenated conjugated diene-derived structure unit."

CITATION LIST

Patent Literature

PTL 1: Japanese Laid-Open Patent Publication No. 2020-19705

SUMMARY OF INVENTION

Technical Problem

Currently there are demands for further improvement in properties of a positive electrode in which a conductive material such as carbon nanotubes is used. Under the above circumstances, an object of the present disclosure is to provide a positive electrode with which a nonaqueous electrolyte secondary battery having improved properties can be obtained, and a nonaqueous electrolyte secondary battery including the positive electrode.

Solution to Problem

An aspect of the present disclosure relates to a positive electrode for a nonaqueous electrolyte secondary battery. The positive electrode for a nonaqueous electrolyte secondary battery includes a positive-electrode current collector and a positive-electrode mixture layer on a surface of the positive-electrode current collector. The positive-electrode mixture layer includes a positive-electrode active material, a conductive material, and binders. The binders include a polyvinylpyrrolidone-based compound and a cellulose derivative.

Another aspect of the present disclosure relates to a nonaqueous electrolyte secondary battery. The nonaqueous electrolyte secondary battery includes the positive electrode for a nonaqueous electrolyte secondary battery according to the present disclosure.

Advantageous Effects of Invention

According to the present disclosure, it is possible to realize a nonaqueous electrolyte secondary battery that has improved properties.

Although novel features of the present invention are described in the appended claims, the following detailed description referring to the drawings together with other objects and features of the present invention will further facilitate understanding of both the configuration and the content of the present invention.

BRIEF DESCRIPTION OF DRAWINGS

The Drawing is a schematic perspective view of a nonaqueous electrolyte secondary battery according to an embodiment of the present disclosure, from which a portion has been removed.

DESCRIPTION OF EMBODIMENTS

The following describes an embodiment according to the present disclosure referring to an example, but the present disclosure is not limited to the following example. In the following description, specific numerical values and materials are described as examples, but other numerical values and materials may be applied as long as effects of the present disclosure can be achieved. In the present specification, the wording "from a numerical value A to a numerical value B"

refers to a range that includes the numerical values A and B, and can be read as "the numerical value A or more and the numerical value B or less".

(Positive Electrode for Nonaqueous Electrolyte Secondary Battery)

A positive electrode according to the present embodiment is a positive electrode for a secondary battery and includes a positive-electrode current collector and a positive-electrode mixture layer on a surface of the positive-electrode current collector. The positive-electrode mixture layer includes a positive-electrode active material, a conductive material, and binders. The binders include a polyvinylpyrrolidone-based compound and a cellulose derivative. The positive-electrode mixture layer may also include another component (for example, a thickener) as necessary.

Polyvinylpyrrolidone and the like have been conventionally used as additives in positive-electrode mixture layers of secondary batteries. However, there are countless types of additives, and sufficient examination has not been carried out on effects obtained by combinations of additives. Also, it is difficult for those skilled in the art to predict effects that can be obtained by combining additives. If effects that can be obtained by combining additives are predictable, it is possible to determine the optimal combination of additives without carrying out experiments. However, actually, it is difficult to predict effects that can be obtained by combining additives. The inventors of the present invention carried out examination and newly found a combination with which a unique effect can be obtained. Specifically, the inventors of the present invention found that it is possible to produce a secondary battery having improved properties as indicated by Examples by using binders including a polyvinylpyrrolidone-based compound and a cellulose derivative. The present disclosure is based on this finding.

(Binder)

Examples of the cellulose derivative used as the binder include alkyl cellulose such as methyl cellulose, hydroxyalkyl cellulose, and alkali metal salts thereof. Examples of alkali metals forming the alkali metal salts include potassium and sodium. Among these, methyl cellulose, ethyl cellulose, and hydroxypropyl methyl cellulose are preferable. The cellulose derivative may have a weight-average molecular weight within a range from 1000 to 1000000 (for example, a range from 10000 to 1000000). The weight-average molecular weight of the cellulose derivative may be within a range from 10000 to 200000, in which case, effects of the configuration according to the present disclosure increase.

The polyvinylpyrrolidone-based compound is at least one selected from the group consisting of polyvinylpyrrolidone and polyvinylpyrrolidone derivatives. Examples of polyvinylpyrrolidone derivatives include polymers formed as a result of a hydrogen atom included in polyvinylpyrrolidone being replaced by another substituent, such as alkylated polyvinylpyrrolidone. It is possible to use only polyvinylpyrrolidone or a copolymer of vinylpyrrolidone and another monomer, as the polyvinylpyrrolidone-based compound. Examples of the other monomer include a styrene-based monomer and a vinyl acetate-based monomer.

The polyvinylpyrrolidone-based compound may have a weight-average molecular weight within a range from 1000 to 2000000. The weight-average molecular weight of the polyvinylpyrrolidone-based compound may be within a range from 5000 to 1000000, in which case, the effects of the configuration according to the present disclosure increase.

The amount of the cellulose derivative included in the positive-electrode mixture layer is preferably within a range from 30 to 400 parts by mass (for example, 100 to 400 parts by mass or 300 to 400 parts by mass) with respect to 100 parts by mass of the polyvinylpyrrolidone-based compound. When the amount is within the range from 100 to 400 parts by mass, particularly high effects can be obtained as shown in the Examples.

The binders may further include nitrile-based rubber. Examples of the nitrile-based rubber include a copolymer of monomers including acrylonitrile and a diene (for example, butadiene). Examples of the nitrile-based rubber include acrylonitrile-based rubber such as nitrile-butadiene rubber (NBR) and hydrogenated nitrile-butadiene rubber (H-NBR). When the binders include the polyvinylpyrrolidone-based compound, the cellulose derivative, and the nitrile-based rubber, particularly high effects can be obtained as shown in the Examples.

The amount of the nitrile-based rubber included in the positive-electrode mixture layer is preferably within a range from 30 to 500 parts by mass (for example, 100 to 300 parts by mass) with respect to 100 parts by mass of the polyvinylpyrrolidone-based compound. When the amount is within the range from 100 to 300 parts by mass, particularly high effects can be obtained as shown in the Examples.

The weight-average molecular weight of the nitrile-based rubber is not particularly limited and is only required to be within a range that allows the nitrile-based rubber to be used as a binder in a nonaqueous electrolyte secondary battery.

The binders may further include polyvinylidene fluoride. When the binders include the polyvinylpyrrolidone-based compound, the cellulose derivative, the nitrile-based rubber, and polyvinylidene fluoride, steric hindrance of molecular chains has a great effect on migration of the binders, and consequently binding strength increases. Moreover, a side reaction with a lithium component included in the positive-electrode active material is suppressed by the cellulose derivative and the nitrile-based rubber, which are chemically stable, and accordingly, a reduction in the binding strength due to migration can be suppressed. Particularly in the case where a lithium-containing complex oxide in which the proportion of Ni is high is used as the positive-electrode active material, a side reaction with the lithium component is facilitated, and accordingly, a high synergistic effect can be obtained when the binders include the polyvinylpyrrolidone-based compound, the cellulose derivative, the nitrile-based rubber, and polyvinylidene fluoride. The amount of polyvinylidene fluoride included in the positive-electrode mixture layer may be within a range from 50 to 5000 parts by mass (for example, 200 to 2000 parts by mass) with respect to 100 parts by mass of the polyvinylpyrrolidone-based compound.

The binders may also include a binder other than those described above. A known binder may be used as the other binder. However, the proportion of the other binder in all binders is low, and is 10 mass % or less, for example.

The amount of binders included in the positive-electrode mixture layer may be within a range from 0.1 to 2 parts by mass with respect to 100 parts by mass of the positive-electrode active material.

(Conductive Material)

Examples of the conductive material include conductive materials containing carbon. For example, it is possible to use conductive carbon particles such as carbon black, graphene, and fibrous conductive carbon materials such as carbon nanofibers and carbon nanotubes as conductive materials containing carbon, and carbon nanotubes are preferably used. In the following description, fibrous conductive carbon materials may also be referred to as "carbon fibers". Preferable carbon fibers are carbon nanotubes, and accordingly, "carbon fibers" referred to in the following description may be read as "carbon nanotubes". The proportion of carbon nanotubes in all conductive materials is 50 mass % or more, for example, and preferably within a range from 66 to 100 mass % (for example, 80 to 100 mass % or 90 to 100 mass %).

As described above, carbon nanotubes are preferably used as the conductive material. When carbon nanotubes are used as the conductive material, it is possible to obtain particularly high effects by using the binders including the polyvinylpyrrolidone-based compound and the cellulose derivative. Specifically, it is possible to increase adhesive strength of the positive-electrode mixture layer and a discharge capacity, and reduce an internal resistance of the battery.

Regarding dispersion of carbon nanotubes, the polyvinylpyrrolidone-based compound has good wettability for carbon nanotubes and accordingly has a certain effect on improvement of dispersibility, but steric hindrance of the polyvinylpyrrolidone-based compound is low, and therefore, there is a problem in long-term dispersion stability. On the other hand, the following unique effect can be achieved when the polyvinylpyrrolidone-based compound and the cellulose derivative are used in combination. The polyvinylpyrrolidone-based compound functions not only as a dispersant but also as a dispersion aid for the cellulose derivative, which realizes long-term dispersion stability due to its high steric hindrance but has low affinity to a polar aprotic solvent, and therefore, dispersibility and long-term dispersion stability can be realized at the same time.

Carbon nanotubes are small carbon fibers having a fiber diameter in the order of nanometer. In the case where carbon nanotubes are used as the conductive material, the resistance of the positive-electrode mixture layer can be reduced even with a small amount of carbon nanotubes.

The carbon nanotubes may have an average fiber length of 1 μm or more. In this case, an aspect ratio (a ratio of the length of a fiber to an outer diameter of the fiber) of the carbon nanotubes, which are carbon fibers, is very large. Carbon fibers that have a large aspect ratio realize line contact with the active material and the current collector, rather than point contact. The DC resistance (DCR) of the battery improves as a result of the carbon fibers having excellent conductivity being present between particles of the positive-electrode active material and forming line contact with the particles.

Additionally, carbon fibers occupy only a small volume in the positive-electrode mixture layer, and therefore, it is possible to increase the proportion of the positive-electrode active material in the positive-electrode mixture layer. Also, with use of carbon fibers, it is possible to suppress a problem (an increase in the resistance) that occurs when the thickness of the positive-electrode mixture layer is increased or the positive-electrode mixture layer is compressed as described above. Therefore, it is possible to increase the thickness of the positive-electrode mixture layer or further compress the positive-electrode mixture layer when carbon fibers are used. On the other hand, it was found that when the capacity is further increased as described above, problems such as a reduction in the adhesive strength of the positive-electrode mixture layer, an increase of positive-electrode active materials that do not contribute to the discharge capacity, and an increase in the internal resistance occur. The inventors of the present invention found through studies that these problems can be solved by the special combination of binders.

The content of carbon fibers with respect to 100 parts by mass of the positive-electrode active material is 1 part by mass or less, for example. The content of carbon fibers with respect to 100 parts by mass of the positive-electrode active material may be 0.01 parts by mass or more and 1 part by mass or less, or 0.02 parts by mass or more and 0.5 parts by mass or less. The content of carbon fibers described above is a value relative to the mass of the positive-electrode active material in a discharged state.

The average fiber length of carbon fibers is determined through image analysis with use of a scanning electron microscope (SEM). The average fiber length of carbon fibers is determined by measuring lengths of arbitrarily selected carbon fibers (for example, about 100 carbon fibers) and calculating the arithmetic mean of the measured lengths, for example. The term fiber length refers to the length of a linearly extended carbon fiber.

The average fiber diameter (outer diameter) of carbon fibers is 20 nm or less, for example, and may be 15 nm or less. The average fiber diameter of carbon fibers is determined through image analysis with use of a transmission electron microscope (TEM). The average fiber diameter of carbon fibers is determined by measuring fiber diameters of arbitrarily selected carbon fibers (for example, 100 carbon fibers) and calculating the arithmetic mean of the measured diameters, for example. The term fiber diameter refers to the length of a fiber in a direction perpendicular to the fiber length direction.

The proportion of the positive-electrode active material in the positive-electrode mixture layer is determined with use of a mixture sample. The mixture sample is obtained by washing the positive electrode obtained by decomposing the discharged secondary battery, with an organic solvent, thereafter drying the positive electrode in a vacuum, and then removing only the positive-electrode mixture layer. Proportions of binder components and conductive material components other than the positive-electrode active material can be calculated by performing thermal analysis such as TG-DTA on the mixture sample. In a case where a plurality of types of carbon materials are included in the binder components and the conductive material components, the proportion of carbon fibers can be calculated by performing Raman microscopy on a cross section of the positive-electrode mixture layer.

It is possible to use any of single walled carbon nanotubes, double walled carbon nanotubes, and multi walled carbon nanotubes, and two or more of these types of carbon nanotubes may also be used. It is preferable to use carbon nanotubes having an average fiber diameter of 20 nm or less because a significant effect can be obtained with a small amount of such carbon nanotubes. The average fiber length of carbon nanotubes is preferably 1 μm or more from the viewpoint of assuring electron conductivity in the positive electrode. On the other hand, an upper limit is not set for the fiber length as long as carbon nanotubes are arranged appropriately within the positive electrode. In view of the fact that a positive-electrode active material commonly has a particle diameter of 1 μm or more and 20 μm or less, it is thought that a fiber length similar to the particle diameter is appropriate. That is, the average fiber length of carbon nanotubes may be 1 μm or more and 20 μm or less, for example.

The positive-electrode mixture layer of the positive electrode according to the present embodiment satisfies the following condition (1). The positive-electrode mixture layer preferably satisfies at least one of the following conditions (2) to (8). The conditions (2) to (8) can be combined suitably.

(1) The binders include the polyvinylpyrrolidone-based compound and the cellulose derivative.
(2) The mass ratio between components included in the binders may be: polyvinylpyrrolidone-based compound:cellulose derivative:acrylonitrile-based rubber: polyvinylidene fluoride=100:30 to 400:0 to 3000:0 to 5000. The ratios of the components other than the polyvinylpyrrolidone-based compound relative to the polyvinylpyrrolidone-based compound may be changed to the ranges described above.
(3) Examples of the cellulose derivative include methyl cellulose, ethyl cellulose, and hydroxypropyl methyl cellulose.
(4) The binders include acrylonitrile-based rubber. Examples of acrylonitrile-based rubber include NBR and H-NBR.
(5) The binders include polyvinylidene fluoride or polytetrafluoroethylene.
(6) The conductive material includes a carbon material such as carbon nanotubes, carbon black, or graphene. The proportion of carbon nanotubes in the conductive material may be within the range described above. The ratio between the total mass of the binders and the mass of the conductive material (or the ratio between the total mass of the binders and the mass of carbon nanotubes) may be: total mass of binders:conductive material=100:1 to 100.
(7) The ratio (mass ratio) between the positive-electrode active material, the binders, and the conductive material is: positive-electrode active material:binders:conductive material=100:0.1 to 2:0.01 to 1.
(8) The polyvinylpyrrolidone-based compound is polyvinylpyrrolidone.

(Positive-Electrode Active Material)

Examples of the positive-electrode active material include complex oxides that contain lithium and a transition metal. Such complex oxides may also be referred to as "lithium-containing complex oxides" in this specification. Lithium-containing complex oxides may have a layered structure (for example, a rock salt crystal structure). The positive-electrode active material is preferably a lithium-containing complex oxide represented by a compositional formula $Li_yNi_xM_{1-x}O_2$ (where x and y satisfy $0.8 \le x \le 1$ and $0 \le y \le 1.2$, and M includes at least one element selected from the group consisting of Co, Al, Mn, Fe, Ti, Sr, Ca, and B). M may be at least one element selected from the group consisting of Co, Al, Mn, Fe, Ti, Sr, Ca, and B. In particular, M preferably includes at least one element selected from the group consisting of Co, Mn, Al, and Fe. In the above example, M is typically a metal element. From the viewpoint of stability of the crystal structure, Al may be contained as the element M. Note that the value y representing a compositional ratio of lithium increases and decreases as the battery is charged and discharged. A specific example of such a complex oxide is a lithium-nickel-cobalt-aluminum complex oxide (for example, $LiNi_{0.9}Co_{0.05}Al_{0.05}O_2$).

From the viewpoint of achieving a high capacity, the proportion of Ni in metal elements other than Li contained in the lithium-containing complex oxide is preferably 80 atom % or more. The proportion of Ni in the metal elements other than Li may be 85 atom % or more, or 90 atom % or more. For example, x in the compositional formula shown above may satisfy 0.851. The proportion of Ni in the metal elements other than Li is preferably 95 atom % or less, for example. The lower limits and the upper limits can be combined suitably.

At least one element selected from Sr and Ca may be unevenly distributed near the surface of the positive-electrode active material. That is, surfaces of particles of the positive-electrode active material may be at least partially covered with a surface modification layer that includes at least one element selected from Sr and Ca. The positive-electrode active material is usually present as secondary particles formed through agglomeration of primary particles of the complex oxide in the positive-electrode mixture layer. In such a case, the surface modification layer can cover at least portions of surfaces of the primary particles. The surface modification layer can be formed as a result of some metal elements other than lithium constituting the complex oxide being replaced by at least one of Sr and Ca at the surfaces of the positive-electrode active material particles (for example, primary particles). Note that a method for producing such surface-modified positive-electrode active material particles will be described later.

As the proportion of nickel in the complex oxide increases, the structure of the surface of the active material becomes unstable during charging, and as a result of Li being released, the crystal structure tends to change to a structure that makes absorption and release of Li ions difficult.

In particular, a nickel oxide (NiO) layer tends to be formed on the surface of the positive-electrode active material in the case where the proportion of nickel in the complex oxide is high. The NiO layer has a structure that makes absorption and release of Li ions difficult. If a thick NiO layer is formed, the resistance of the positive electrode increases and cycle properties may degrade. Also, as the NiO layer is formed, metal constituting the complex oxide may be eluted in the electrolyte solution, deposited on the negative electrode, and affect the durability of the secondary battery.

Furthermore, in the case where the positive electrode or the electrolyte solution contains water, a reaction with a lithium salt such as $LiPF_6$ contained in the electrolyte solution may occur and HF (hydrogen fluoride) may be generated. The generated HF promotes elution of metal constituting the complex oxide and deteriorates the cycle properties.

Although nickel contained in the complex oxide is in the trivalent state or the tetravalent state and contributes to charging and discharging, the nickel element is stable when it is in the divalent state. Conversion to the divalent state is an irreversible reaction, and once nickel has been converted to the divalent state, it does no longer contribute to charging and discharging and does not return to the trivalent or tetravalent oxidation state within the battery. Trivalent or tetravalent nickel can be converted to divalent nickel as a result of being reduced through a reaction with water, for example. In particular, trivalent or tetravalent nickel tends to be converted to divalent nickel as a result of being strongly reduced by HF. Accordingly, in the case where the proportion of nickel contained in the composite oxide is high, deterioration of the cycle properties is likely to be promoted due to elution of cations and structural collapse in the presence of HF.

The lithium-containing complex oxide may be represented by a compositional formula $Li_aNi_xM2_{1-x}O_{2-\delta}$ (where a, x, and δ satisfy $0 \le 1.2$, $0.8 \le x < 1$, and $0 \le \delta \le 0.05$, and M2 includes at least one element selected from the group consisting of Mn, Fe, Ti, Si, Nb, Zr, Mo, Co, Al, Zn, Sr, and Ca). In order to achieve a high capacity, the proportion x of Ni in the compositional formula may be 0.85 or more ($x \ge 0.85$).

M2 in the compositional formula may include (i) at least one element selected from the group consisting of Mn, Fe, Ti, Si, Nb, Zr, Mo, Co, Al, and Zn and (ii) at least one element A selected from Sr and Ca. It is thought that when at least one of Sr and Ca (for example, Sr and/or Ca) is contained in the composite oxide, the surface structure of the complex oxide becomes stable, elution of metal is suppressed, and high cycle properties can be maintained even in an environment in which HF is likely to be generated.

The complex oxide may contain the element A (at least one element selected from Sr and Ca, for example, Sr and/or Ca). The element A stabilizes the crystal structure of the surface of the complex oxide even in a state where a large amount of Li has been extracted through charging. The element A is only required to be present at the surface of the complex oxide. A surface layer including the element A may be formed on the surface of the complex oxide.

The element A is preferably present on the surfaces of complex oxide particles and the vicinity of the surfaces (for example, regions within a depth of 30 nm from the surfaces of the particles). The complex oxide particles are usually secondary particles formed through agglomeration of a plurality of primary particles, and the concentration of the element A may be higher at surfaces of the primary particles including surfaces of the secondary particles and the vicinity of the surfaces than in center portions of the primary particles. That is, the element A may be unevenly distributed in the surfaces of the primary particles of the complex oxide and the vicinity of the surfaces, and the content of the element A per unit volume may be higher in the surfaces of the primary particles than in inner portions of the primary particles. Note that the distribution of Ca contained in the complex oxide can be analyzed through TEM-EDX, for example.

From the viewpoint of improving the cycle properties, the content of the element A in the complex oxide relative to the total number of moles of metal elements other than Li may be 0.01 mol % or more, 0.015 mol % or more, or 0.03 mol % or more. On the other hand, from the viewpoint of suppressing a reduction in the capacity due to an increase in the resistance at the surface of the complex oxide, the content of the element A in the complex oxide relative to the total number of moles of metal elements other than Li may be 2 mol % or less, 1.7 mol % or less, or 1.5 mol % or less.

As the proportion x of Ni in the above-described lithium-containing complex oxide increases, more lithium ions can be extracted from the lithium-containing complex oxide during charging, and the capacity can be increased. However, the crystal structure tends to be unstable due to charging, and as the battery is repeatedly charged and discharged, the crystal structure tends to change (be inactivated) to a structure that makes reversible absorption and release of lithium ions difficult. Consequently, the cycle properties tend to degrade.

Particularly in the case where a lithium salt containing fluorine (for example, $LiPF_6$) is used as a solute of the electrolyte solution, HF may be generated through a reaction shown below when water is contained or generated in the electrolyte solution. Also, HF may be generated as a result of decomposition of a fluorinated solvent such as fluoroethylene carbonate (FEC) contained in the electrolyte solution or a fluorine component contained in a thickener or a binder in a strong alkaline environment.

$$LiPF_6 + H_2O \rightarrow LiPOF_4 + 2HF$$

The generated HF promotes elution of metal other than lithium contained in the complex oxide and promotes inactivation of the crystal structure of the surface of the complex oxide to a structure that makes reversible absorption and release of lithium ions difficult. This leads to further deterioration of the cycle properties.

However, it is possible to suppress elution of metal, which is caused by the generated HF, and suppress deterioration of the cycle properties by using the above-described additives in the positive electrode. Furthermore, in the case where the element A is contained at least at the surface of the complex oxide, the surface of the complex oxide is stabilized. Due to a synergistic effect of these configurations, the cycle properties can be remarkably improved even when a lithium-containing complex oxide in which the proportion x of Ni is 0.8 or more is used as the positive-electrode active material. Accordingly, it is possible to realize a secondary battery having excellent cycle properties and a high energy density.

From the viewpoint of achieving a high capacity, the proportion x of Ni in the lithium-containing complex oxide may be 0.85 or more, or 0.9 or more.

The lithium-containing complex oxide containing the element A at least at its surface can be produced with use of a method including: a step (i) of obtaining a lithium-containing complex oxide that contains Ni and a suitable metal element MO other than Sr and Ca; a step (ii) of obtaining a mixture by mixing the lithium-containing complex oxide obtained in the step (i) and a compound that contains at least one element A selected from Sr and Ca; and a step (iii) of firing the mixture, for example. The metal element MO is a metal element constituting the lithium-containing complex oxide.

In the step (i), an alkaline solution of sodium hydroxide or the like is dripped into a solution of a metal salt that contains Ni and the metal element MO while stirring the solution to adjust the pH to the alkaline range (for example, 8.5 to 12.5), and thus a complex hydroxide containing Ni and the metal element MO is precipitated (coprecipitation). Subsequently, the complex hydroxide is fired to obtain a complex oxide containing Ni and the metal element MO. The firing temperature is not particularly limited, and is 300° C. to 600° C., for example.

In the step (ii), the complex oxide obtained in the step (i), a lithium compound, and a compound containing the element A are mixed to obtain a mixture. The complex oxide and the lithium compound are mixed at a ratio adjusted in such a manner that a molar ratio between metal elements other than Li and Li is 1:0.98 to 1:1.1, for example. Examples of the lithium compound include $Li_2CO_3$, LiOH, $Li_2O_2$, $Li_2O$, $LiNO_3$, $LiNO_2$, $Li_2SO_4$, $LiOH \cdot H_2O$, LiH, and LiF. Examples of the compound containing the element A include inorganic compounds such as an oxide, a chloride, and a hydroxide that contain the element A.

In the step (iii), the mixture obtained in the step (ii) is fired at a predetermined temperature for a predetermined time to obtain a complex oxide. The step (iii) may be a firing step performed in an oxygen gas flow, for example.

The ratio of the element A to the total of Ni and the metal element MO in the finally obtained complex oxide is adjusted by controlling the mixing ratio of the raw materials in the step (ii), the firing temperature and the firing time in the step (iii), and the like, for example.

Powder of the lithium-containing complex oxide having a moisture content of 3 to 8 mass %, for example, is obtained by washing the complex oxide obtained in the step (iii) with water and performing solid-liquid separation. The mixed powder of complex oxide is subjected to heat treatment at a low temperature of 150° C. to 280° C. in a vacuum. The heat treatment temperature is more preferably 150° C. to 210° C.

When the heat treatment is performed on the mixed powder at a low temperature in a vacuum, the occurrence of cation mixing is suppressed.

Contents of elements constituting the lithium-containing complex oxide can be measured with use of inductively coupled plasma atomic emission spectroscopy (ICP-AES), an electron probe micro analyzer (EPMA), energy dispersive X-ray spectroscopy (EDX), or the like.

As the proportion of Ni in the above-described lithium-containing complex oxide increases (i.e., as the value x in the compositional formula shown above increases), more lithium ions can be extracted from the lithium-containing complex oxide during charging, and consequently, the capacity can be increased. However, the valence of Ni contained in the lithium-containing complex oxide for which the capacity is increased as described above tends to be high. Therefore, the crystal structure tends to be unstable particularly in a fully charged state, and as the battery is repeatedly charged and discharged, the crystal structure of the surfaces of the active material particles tends to change (be inactivated) to a structure that makes reversible absorption and release of lithium ions difficult. Consequently, the cycle properties tend to degrade. Particularly in a case where the amount of the positive-electrode active material per unit area is increased, flows of lithium ions and/or electrons tend to be hindered in charging and discharging reactions, and the charging and discharging reactions tend to progress in a nonuniform manner. If the charging and discharging reactions progress in a nonuniform manner, inactivation of the crystal structure may progress in a region where the charging and discharging reactions have progressed excessively and a large amount of lithium ions have been extracted, and the cycle properties may degrade.

However, the resistance of the positive-electrode mixture layer can be reduced in the positive electrode for a secondary battery according to the present embodiment. Therefore, it is possible to maintain high cycle properties even when a lithium-containing complex oxide in which the proportion x of Ni is high is used as the active material. Accordingly, it is possible to realize a secondary battery having excellent cycle properties and a high energy density.

The mass of the positive-electrode mixture layer (single layer) per 1 $m^2$ may be 200 g or more, and is preferably 250 g or more. It is possible to increase the capacity of the lithium ion battery by setting the mass to 250 g or more. With the positive electrode plate according to the present disclosure, it is possible to suppress problems that occur as a result of the mass being increased, as described above. The mass can be increased by increasing the thickness of the positive-electrode mixture layer or increasing the density of the positive-electrode mixture layer, for example.

The thickness of the positive-electrode mixture layer is not particularly limited, and may be within a range from 50 μm to 250 μm. According to the present embodiment, it is possible to suppress an increase in the internal resistance even when the thickness of the positive-electrode mixture layer is increased.

(Positive-Electrode Current Collector)

The shape and the thickness of the positive-electrode current collector can be selected according to the application, and can be selected in such a manner as to correspond to the shape and the thickness of a negative-electrode current collector. Examples of materials of the positive-electrode current collector include stainless steel, aluminum, an aluminum alloy, and titanium.

The following describes an example of the configuration of a nonaqueous electrolyte secondary battery according to the present disclosure. The secondary battery includes the positive electrode according to the present disclosure. The secondary battery may include a positive electrode, a negative electrode, a nonaqueous electrolyte, and a separator described below, for example.

(Positive Electrode)

As described above, the positive electrode according to the present disclosure is used as the positive electrode. The positive-electrode mixture layer may be formed as described below, for example. First, a positive-electrode slurry is prepared by dispersing materials of the positive-electrode mixture layer (the positive-electrode active material, the conductive material, the binders, and other optional components used as necessary) in a dispersion medium. Next, the positive-electrode slurry is applied to a surface of the positive-electrode current collector to form a coating film, and the coating film is dried to form the positive-electrode mixture layer. The dried coating film may be rolled as necessary. The positive-electrode mixture layer may be formed on one surface of the positive-electrode current collector or both surfaces of the positive-electrode current collector. The positive-electrode mixture layer may include a thickener and the like as optional components. Known materials may be used as the optional components. The ratio between components included in the positive-electrode slurry is reflected in the ratio between the components included in the positive-electrode mixture layer. Therefore, it is possible to change the ratio between the components included in the positive-electrode mixture layer by changing the ratio between the components included in the positive-electrode slurry.

(Negative Electrode)

The negative electrode includes a negative-electrode active material. The negative electrode usually includes a negative-electrode current collector and a negative-electrode mixture in the form of a layer (hereinafter referred to as a "negative-electrode mixture layer") on the negative-electrode current collector. The negative-electrode mixture layer can be formed by applying a negative-electrode slurry, which is prepared by dispersing components of the negative-electrode mixture in a dispersion medium, to a surface of the negative-electrode current collector, and drying the formed coating film. The dried coating film may be rolled as necessary The negative-electrode mixture layer includes the negative-electrode active material as an essential component, and may include a binder, a thickener, a conductive material, and the like as optional components. A known negative electrode that is used as a negative electrode of a nonaqueous electrolyte secondary battery may be used as the negative-electrode mixture layer.

(Negative-Electrode Active Material)

As the negative-electrode active material, it is possible to use metallic lithium, a lithium alloy, or the like, but a material that can absorb and release lithium ions electrochemically is preferably used. Examples of such materials include carbonaceous materials and Si-containing materials. The negative-electrode active material may include a Si-containing material or may be a Si-containing material. The negative electrode may include a negative-electrode active material alone or two or more negative-electrode active materials in combination.

Examples of carbonaceous materials include graphite, easily-graphitizable carbon (soft carbon), and hardly-graphitizable carbon (hard carbon). It is possible to use a carbonaceous material alone or two or more carbonaceous materials in combination. In particular, graphite is preferably used as a carbonaceous material because stability in charging and discharging is excellent and the irreversible capacity is small. Examples of graphite include natural graphite, artificial graphite, graphitized mesophase carbon particles.

Examples of Si-containing materials include the simple substance Si, a silicon alloy, a silicon compound (for example, a silicon oxide), and a complex material in which a silicon phase is distributed in a lithium ion conductive phase (matrix). Examples of the silicon oxide include $SiO_x$ particles. x satisfies $0.5 \leq x < 2$, for example, and may satisfy $0.81 \leq x \leq 6$. As the lithium ion conductive phase, it is possible to use at least one selected from a $SiO_2$ phase, a silicate phase, and a carbon phase.

As the binder, the thickener, the conductive material, and the dispersion medium used in the negative-electrode slurry, it is possible to use the materials described as examples of materials of the positive electrode, for example.

It is possible to use a metal foil as the negative-electrode current collector, for example. The negative-electrode current collector may be porous. Examples of materials of the negative-electrode current collector include stainless steel, nickel, a nickel alloy, copper, and a copper alloy. The thickness of the negative-electrode current collector is not particularly limited, and is 1 to 50 µm, for example, and may be 5 to 30 µm.

(Nonaqueous Electrolyte)

The nonaqueous electrolyte (nonaqueous electrolyte solution) includes a solvent and a solute dissolved in the solvent. The solute is an electrolyte salt that dissociates into ions in the electrolyte solution. The solute may include a lithium salt, for example. Components of the electrolyte solution other than the solvent and the solute are additives. The electrolyte solution may include various additives.

A known material can be used as the solvent. For example, a cyclic carbonic acid ester, a chain carbonic acid ester, a cyclic carboxylic acid ester, a chain carboxylic acid ester, or the like is used as the solvent. Examples of cyclic carbonic acid esters include propylene carbonate (PC), ethylene carbonate (EC), fluoroethylene carbonate (FEC), and vinylene carbonate (VC). Examples of chain carbonic acid esters include diethyl carbonate (DEC), ethyl methyl carbonate (EMC), and dimethyl carbonate (DMC). Examples of cyclic carboxylic acid esters include γ-butyrolactone (GBL) and γ-valerolactone (GVL). Examples of chain carboxylic acid esters include nonaqueous solvents such as methyl acetate, ethyl acetate, propyl acetate, methyl propionate (MP), and ethyl propionate (EP). It is possible to use a nonaqueous solvent alone or two or more nonaqueous solvents in combination.

As the lithium salt, it is possible to use a lithium salt of a chlorine-containing acid ($LiClO_4$, $LiAlCl_4$, $LiB_{10}Cl_{10}$, etc.), a lithium salt of a fluorine-containing acid ($LiPF_6$, $LiPF_2O_2$, $LiBF_4$, $LiSbF_6$, $LiAsF_6$, $LiCF_3SO_3$, $LiCF_3CO_2$, etc.), a lithium salt of a fluorine-containing acid imide ($LiN(FSO_2)_2$, $LiN(CF_3SO_2)_2$, $LiN(CF_3SO_2)(C_4F_9SO_2)$, $LiN(C_2F_5SO_2)_2$, etc.), a lithium halide (LiCl, LiBr, LiI, etc.), or the like. It is possible to use a lithium salt alone or two or more lithium salts in combination.

The concentration of lithium salt in the electrolyte solution may be 1 mol/L or more and 2 mol/L or less, or 1 mol/L or more and 1.5 mol/L or less. When the concentration of lithium salt is controlled so as to fall within the above range, it is possible to obtain an electrolyte solution that has excellent ion conductivity and appropriate viscosity. However, the concentration of lithium salt is not limited to the above range.

The electrolyte solution may include other known additives. Examples of additives include 1,3-propanesultone, methyl benzene sulfonate, cyclohexylbenzene, biphenyl, diphenyl ether, and fluorobenzene.

(Separator)

The separator is arranged between the positive electrode and the negative electrode. The separator has high ion permeability, appropriate mechanical strength, and insulating properties. It is possible to use a microporous thin film, woven cloth, nonwoven cloth, or the like as the separator. It is preferable to use a polyolefin such as polypropylene or polyethylene as the material of the separator.

An example of the structure of the nonaqueous electrolyte secondary battery is a structure including an electrode group that is formed by winding the positive electrode and the negative electrode with the separator arranged therebetween and is housed in an outer covering body together with the nonaqueous electrolyte. However, there is no limitation to this structure, and an electrode group of another form may also be used. For example, it is also possible to use a stacked electrode group formed by stacking the positive electrode and the negative electrode with the separator arranged therebetween. The shape of the nonaqueous electrolyte secondary battery is not limited, and may be a cylindrical shape, a rectangular shape, a coin shape, a button shape, or a laminate shape, for example.

The Drawing is a schematic perspective view of a rectangular nonaqueous electrolyte secondary battery according to an embodiment of the present disclosure, from which a portion has been removed. The battery includes a rectangular bottomed battery case 4, an electrode group 1 housed in the battery case 4, and a nonaqueous electrolyte (not shown). The electrode group 1 includes a negative electrode having an elongated strip shape, a positive electrode having an elongated strip shape, and a separator arranged between the negative electrode and the positive electrode. The negative-electrode current collector of the negative electrode is electrically connected via a negative electrode lead 3 to a negative electrode terminal 6 provided on a seal plate 5. The negative electrode terminal 6 is insulated from the seal plate 5 by a resin gasket 7. The positive-electrode current collector of the positive electrode is electrically connected via a positive electrode lead 2 to a rear surface of the seal plate 5. That is, the positive electrode is electrically connected to the battery case 4 that also serves as a positive electrode terminal. A peripheral edge of the seal plate 5 fits in an open end portion of the battery case 4, and the fitted portion is subjected to laser welding. The seal plate 5 has a hole for pouring the nonaqueous electrolyte therethrough, and the hole is closed with a seal plug 8 after the nonaqueous electrolyte is poured.

EXAMPLES

The following specifically describes the present disclosure based on examples, but the present disclosure is not limited by the following examples.

In the examples, a plurality of nonaqueous electrolyte secondary batteries were produced while changing types and amounts of binders, and properties of the nonaqueous electrolyte secondary batteries were evaluated.

<Batteries A1 to A6, C1, and C2>

[Production of Negative Electrode]

A silicon complex material and graphite were mixed at a mass ratio of silicon complex material:graphite=5:95, and the mixture was used as a negative-electrode active material. The negative-electrode active material, carboxymethyl cellulose sodium (CMC-Na), styrene-butadiene rubber (SBR), and water were mixed at a predetermined mass ratio to prepare a negative-electrode slurry. Next, the negative-electrode slurry was applied to surfaces of a copper foil used as a negative-electrode current collector, the formed coating films were dried, and then extended by applying pressure to form a negative-electrode mixture layer on each surface of the copper foil.

[Production of Positive Electrode]

First, a positive-electrode active material, carbon nanotubes (a conductive material), binders, and N-methyl-2-pyrrolidone (NMP) were mixed at predetermined mass ratios to prepare positive-electrode slurries SA1 to SA6, SC1, and SC2. Table 1 shows the used binders. A lithium-containing complex oxide represented by a compositional formula $LiNi_{0.90}Co_{0.05}Al_{0.05}O_2$ was used as the positive-electrode active material. The carbon nanotubes had an average fiber length of 1 μm and an average fiber diameter of 10 nm. The carbon nanotubes were added in an amount of 0.5 parts by mass with respect to 100 parts by mass of the positive-electrode active material. The binders were used in a total amount of 1 part by mass with respect to 100 parts by mass of the positive-electrode active material. Next, each of the positive-electrode slurries was applied to surfaces of an aluminum foil used as a positive-electrode current collector to form coating films. Next, the coating films were dried and then extended by applying pressure to form a positive-electrode mixture layer on each surface of the aluminum foil. The mass of the positive-electrode mixture layer formed on each surface of the aluminum foil was 250 g/m². That is, the mass of the two positive-electrode mixture layers formed on both surfaces of the aluminum foil was 500 g/m². Thus, positive electrodes PA1 to PA6, PC1, and PC2 were produced.

[Preparation of Electrolyte Solution]

$LiPF_6$ was added as a lithium salt to a mixed solvent containing ethylene carbonate (EC) and ethyl methyl carbonate (EMC) at a volume ratio of 3:7 to prepare an electrolyte solution. The concentration of $LiPF_6$ in the electrolyte solution was 1.0 mol/L.

[Production of Secondary Battery]

A lead tab was attached to each electrode, and an electrode group was produced by spirally winding the positive electrode and the negative electrode with a separator arranged therebetween in such a manner that the leads were located in the outermost circumferential portion. The positive electrodes PA1 to PA6, PC1, and PC2 described above were used. Next, the electrode group was inserted into an outer covering body formed from a laminate film including an aluminum foil as a barrier layer, and dried in a vacuum at 105° C. for 2 hours, then the nonaqueous electrolyte solution was poured into the outer covering body, and an opening of the outer covering body was sealed. Thus, secondary batteries were produced.

The positive electrodes PA1 to PA6, PC1, and PC2 were produced as described above, and the adhesive strength of the positive-electrode mixture layer was evaluated. The adhesive strength was evaluated by evaluating bonding strength between the aluminum foil and the positive-electrode mixture with use of a method specified in JIS6854-1. In order to compare the adhesive strength between samples, electrodes having the same size were prepared and used in the measurement.

Settleability of the positive-electrode slurries was evaluated with use of a centrifugal settling method. Each of the positive-electrode slurries produced as described above was placed in a centrifugal separator, and subjected to centrifugal separation at a rotation speed of 1000 rpm for 1 hour. A supernatant liquid and sediment collected from each sample subjected to centrifugal separation were dried to evaluate solid fractions, and a difference between the solid fraction of the supernatant liquid and the solid fraction of the sediment was taken as a value of the settleability.

Furthermore, the discharge capacity and the DC resistance (DCR) were measured for each of the secondary batteries produced as described above. Table 1 shows types and ratios of the binders, the positive-electrode slurries, and the positive electrodes used in the batteries A1 to A6, C1, and C2, and evaluation results of the secondary batteries. Note that the batteries C1 and C2 are comparative examples. The evaluation results shown in Table 1 are relative values when evaluation results of the positive-electrode slurry SA1, the positive electrode PA1, and the battery A1 are taken as 100%.

TABLE 1

| Battery | Positive-electrode slurry/Positive electrode | Type and ratio (parts by mass) of binders | | | | Evaluation results | | | |
|---|---|---|---|---|---|---|---|---|---|
| | | PVP | Cellulose derivative | H-NBR | PVDF | Settleability of positive-electrode slurry | Adhesive strength (relative value) | Discharge capacity (relative value) | DCR (relative value) |
| C1 | SC1/PC1 | 100 | 0 | 0 | 1000 | 197% | 84% | 100% | 106% |
| C2 | SC/2/PC2 | 0 | 100 | 0 | 1000 | 143% | 123% | 100% | 98% |
| A1 | SA1/PA1 | 100 | 30 | 0 | 1000 | 100% | 100% | 100% | 100% |
| A2 | SA2/PA2 | 100 | 300 | 0 | 1000 | 97% | 131% | 100% | 98% |
| A3 | SA3/PA3 | 100 | 400 | 0 | 1000 | 84% | 137% | 100% | 98% |
| A4 | SA4/PA4 | 100 | 300 | 200 | 1000 | 19% | 151% | 100% | 97% |
| A5 | SA5/PA5 | 100 | 200 | 300 | 1000 | 74% | 165% | 101% | 94% |
| A6 | SA6/PA6 | 100 | 100 | 100 | 1000 | 36% | 143% | 100% | 98% |

In Table 1, PVP represents polyvinylpyrrolidone. Cellulose derivative is hydroxypropyl methyl cellulose. H-NBR represents hydrogenated nitrile-butadiene rubber. PVDF represents polyvinylidene fluoride.

In Table 1, a smaller value of settleability indicates lower settleability (i.e., higher dispersibility and higher dispersion stability). A larger value of adhesive strength indicates higher adhesive strength. In the case where a conductive material that is likely to aggregate, such as carbon nanotubes, is used, dispersibility of materials in a slurry tends to decrease. If the dispersibility is low, a uniform positive-electrode mixture layer is not formed and battery properties degrade. Also, if the dispersibility is low, it may be difficult to form the positive-electrode mixture layer. Particularly in the case where the value of settleability exceeds 120%, productivity significantly decreases.

As shown in Table 1, the dispersibility in the slurries A1 to A6 prepared with use of binders including PVP and the cellulose derivative was significantly high compared with the dispersibility in the slurries C1 and C2. In particular, the dispersibility significantly improved in the positive-electrode slurries SA2 to SA6 in which the amount of the cellulose derivative with respect to 100 parts by mass of PVP was within the range from 100 to 400 parts by mass (for example, 300 to 400 parts by mass). Also, the adhesive strength of the positive-electrode mixture layer and the battery properties significantly improved in the batteries A2 to A6 in which the positive-electrode slurries SA2 to SA6 were used.

Particularly in the cases where polyvinylpyrrolidone (polyvinylpyrrolidone-based compound), the cellulose derivative, and H-NBR (nitrile-based rubber) were used as binders, the dispersibility in the positive-electrode slurry, the adhesive strength of the positive-electrode mixture layer, and the battery properties significantly improved.

As described above, it is clear that the properties are improved by a synergistic effect of polyvinylpyrrolidone (polyvinylpyrrolidone-based compound) and hydroxypropyl methyl cellulose (cellulose derivative). It is thought that this effect becomes particularly high when polyvinylpyrrolidone, the cellulose derivative, and H-NBR are used in combination (or these are used in combination with PVDF).

INDUSTRIAL APPLICABILITY

The present disclosure is applicable to a positive electrode for a nonaqueous electrolyte secondary battery and a nonaqueous electrolyte secondary battery. A secondary battery according to the present disclosure has various uses, and can be preferably used as a main power source of a mobile communication device, a portable electronic device, or the like.

Although the present invention has been described in terms of the presently preferred embodiment, it is to be understood that such a disclosure is not to be interpreted as limiting. Various alterations and modifications will no doubt become apparent to those skilled in the art to which the present invention pertains, after having read the above disclosure. Accordingly, the appended claims should be construed as covering all alterations and modifications that fall within the true spirit and scope of the present invention.

REFERENCE SIGNS LIST

1: electrode group, 2: positive-electrode lead, 3: negative-electrode lead, 4: battery case, 5: seal plate, 6: negative electrode terminal, 7: gasket, 8: seal plug

The invention claimed is:

1. A positive electrode for a nonaqueous electrolyte secondary battery, comprising:
a positive-electrode current collector; and
a positive-electrode mixture layer on a surface of the positive-electrode current collector,
wherein the positive-electrode mixture layer includes a positive-electrode active material, a conductive material, and binders,
the binders include a polyvinylpyrrolidone-based compound and a cellulose derivative,
the positive-electrode active material includes a lithium-containing complex oxide containing Ni, and
the cellulose derivative is at least one selected from a group consisting of alkyl cellulose, hydroxyalkyl cellulose, and alkali metal salts thereof.

2. The positive electrode for a nonaqueous electrolyte secondary battery according to claim 1,
wherein the cellulose derivative is included in an amount of 30 to 400 parts by mass with respect to 100 parts by mass of the polyvinylpyrrolidone-based compound.

3. The positive electrode for a nonaqueous electrolyte secondary battery according to claim 2,
wherein the cellulose derivative is included in an amount of 100 to 400 parts by mass with respect to 100 parts by mass of the polyvinylpyrrolidone-based compound.

4. The positive electrode for a nonaqueous electrolyte secondary battery according to claim 1,
wherein the binders further include nitrile-based rubber.

5. The positive electrode for a nonaqueous electrolyte secondary battery according to claim 4,
wherein the nitrile-based rubber is included in an amount of 100 to 300 parts by mass with respect to 100 parts by mass of the polyvinylpyrrolidone-based compound.

6. The positive electrode for a nonaqueous electrolyte secondary battery according to claim 1,
wherein the binders further include polyvinylidene fluoride.

7. The positive electrode for a nonaqueous electrolyte secondary battery according to claim 1,
wherein the conductive material includes carbon nanotubes.

8. The positive electrode for a nonaqueous electrolyte secondary battery according to claim 1,
wherein the positive-electrode active material is a lithium-containing complex oxide represented by a compositional formula $Li_yNi_xM_{1-x}O_2$ (where x and y satisfy $0.8 \leq x \leq 1$ and $0 < y \leq 1.2$, and M includes at least one element selected from the group consisting of Co, Al, Mn, Fe, Ti, Sr, Ca, and B).

9. The positive electrode for a nonaqueous electrolyte secondary battery according to claim 8,
wherein the x in the compositional formula satisfies $0.85 \leq x \leq 1$.

10. The positive electrode for a nonaqueous electrolyte secondary battery according to claim 1,
wherein at least one element selected from Sr and Ca is unevenly distributed near a surface of the positive-electrode active material.

11. The positive electrode for a nonaqueous electrolyte secondary battery according to claim 1,
wherein the mass of the positive-electrode mixture layer per 1 $m^2$ is 250 g or more.

12. A nonaqueous electrolyte secondary battery comprising the positive electrode for a nonaqueous electrolyte secondary battery according to claim 1.

* * * * *